United States Patent
Rosenbaum

[19]

[11] Patent Number: 5,861,117
[45] Date of Patent: Jan. 19, 1999

[54] PROCESS AND APPARATUS FOR COOLING AN EXTRUDATE

[75] Inventor: James E. Rosenbaum, Denton, Tex.

[73] Assignee: Rumber Materials, Inc., Austin, Tex.

[21] Appl. No.: 587,893

[22] Filed: Jan. 16, 1996

Related U.S. Application Data

[60] Continuation-in-part of Ser. No. 243,842, May 16, 1994, Pat. No. 5,523,328, which is a division of Ser. No. 873,410, Apr. 24, 1992, Pat. No. 5,312,573, which is a continuation-in-part of Ser. No. 740,376, Aug. 1, 1991, abandoned.

[51] Int. Cl.$^6$ .......................... B29B 17/00; B29C 35/16; B29C 47/88
[52] U.S. Cl. .................. 264/37.1; 264/148; 264/177.19; 264/211.12; 264/237; 264/DIG. 69; 425/13; 425/72.1; 425/378.1
[58] Field of Search .......................... 264/37.1, DIG. 69, 264/145, 151, 148, 216, 211.12, 349, 237, 177.17, 177.19; 425/13, 378.1, 72.1

[56] References Cited

U.S. PATENT DOCUMENTS

| | | | |
|---|---|---|---|
| 2,922,194 | 1/1960 | Lampard et al. | 425/72.1 |
| 3,027,599 | 4/1962 | Pluhacek et al. | 264/DIG. 69 |
| 3,210,301 | 10/1965 | White | 521/44.5 |
| 3,242,529 | 3/1966 | Parr et al. | 18/8 |
| 3,267,187 | 8/1966 | Slosberg et al. | 264/122 |
| 3,460,200 | 8/1969 | Zaitsev et al. | 18/8 |
| 3,502,763 | 3/1970 | Ludwig | 264/210 |
| 4,003,408 | 1/1977 | Turner | 138/118 |
| 4,028,288 | 6/1977 | Turner | 521/140 |
| 4,125,578 | 11/1978 | Sear | 264/DIG. 69 |
| 4,133,620 | 1/1979 | Lehner | 425/72 S |
| 4,153,589 | 5/1979 | Triolo | 524/62 |
| 4,178,337 | 12/1979 | Hall et al. | 264/28 |
| 4,237,082 | 12/1980 | Laspisa et al. | 264/148 |
| 4,320,082 | 3/1982 | Houle | 264/257 |
| 4,356,286 | 10/1982 | Bethea et al. | 525/183 |
| 4,423,181 | 12/1983 | Kent | 525/232 |
| 4,452,752 | 6/1984 | Harder et al. | 264/555 |
| 4,481,335 | 11/1984 | Stark, Jr. | 264/37 |
| 4,558,096 | 12/1985 | Boon et al. | 525/171 |
| 4,758,398 | 7/1988 | Sparanay et al. | 264/151 |

(List continued on next page.)

FOREIGN PATENT DOCUMENTS

| | | | |
|---|---|---|---|
| 0401885A1 | 12/1990 | European Pat. Off. | B09B 3/00 |
| 2427070 | 10/1975 | Germany | 264/DIG. 69 |
| 144885 | 11/1980 | Germany | 264/37 |
| 0135625 | 10/1980 | Japan | 264/37 |
| 58135625 | 10/1980 | Japan | 264/37 |
| 0000381 | 1/1983 | Japan | 264/37 |
| 58-81 | 1/1983 | Japan | 264/37 |

OTHER PUBLICATIONS

Plastics Engineering, Apr. 1990, vol. 46, No. 4, pp. 51–53, An Alternative to Landfills for Mixed Plastic Waste John Maczko.
Plastics Engineering, Jun. 1988, vol. 44, No. 6, pp. 39–41, "Extrusion System Recycles Contaminated Plastic Waste", John Maczko.
Kunststoffe., vol. 83, No. 8, Munchen DE, pp. 610–612, J. Wolters, "Werkstoffmesse Fur Recycling", p. 611, Middle Column, Line 10, Right Column, Line 31.
Polymer Engineering and Science, "The Use of Cryogenically Ground Rubber Tires as a Filler in Polyolefin Blends" (Abstract) K. Oliphant and W.E. Baker.
1970 Principles of Polymer Systems; pp. 322–327; "12–5 Two–Dimensional Processes;" Ferdinand Rodriquez.

*Primary Examiner*—Duane S. Smith
*Attorney, Agent, or Firm*—J. M. (Mark) Gilbreth; Robert W. Strozier; Gilbreth & Strozier, P.C.

[57] ABSTRACT

A process for extruding a mixture of thermoplastic and ground whole tire waste, in which the mixture is extruded through a die to form an extrudate, with the extrudate subsequently cooled by directing a cooling gas toward the extrudate top, bottom and sides from a multiplicity of gas jets positioned around the periphery of the extrudate. In addition to an extruder, the apparatus includes a multiplicity of gas jets adjacent the extruder, positioned to direct a cooling gas toward the extrudate top, bottom and sides.

12 Claims, 3 Drawing Sheets

U.S. PATENT DOCUMENTS

| | | | |
|---|---|---|---|
| 4,795,603 | 1/1989 | Nagayasu | 264/328.18 |
| 4,810,458 | 3/1989 | Oshima et al. | 264/555 |
| 4,968,463 | 11/1990 | Levasseur | 264/DIG. 69 |
| 4,970,043 | 11/1990 | Doan et al. | 264/237 |
| 5,010,122 | 4/1991 | Koski | 525/101 |
| 5,108,277 | 4/1992 | Dixon | 425/72 |
| 5,114,648 | 5/1992 | Kuc, Sr. | 264/DIG. 69 |
| 5,141,700 | 8/1992 | Sze | 264/555 |
| 5,157,082 | 10/1992 | Johnson | 525/237 |
| 5,312,573 | 5/1994 | Rosenbaum et al. | 264/37 |
| 5,523,328 | 6/1996 | Rosenbaum et al. | 264/37 |

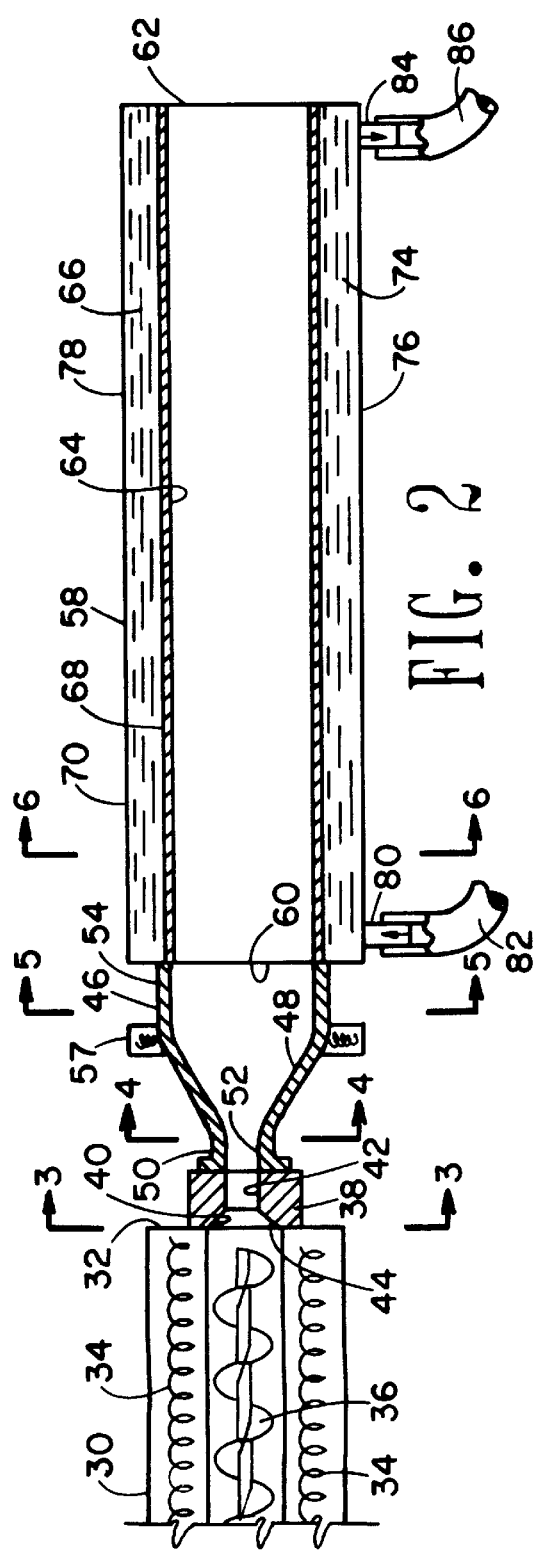
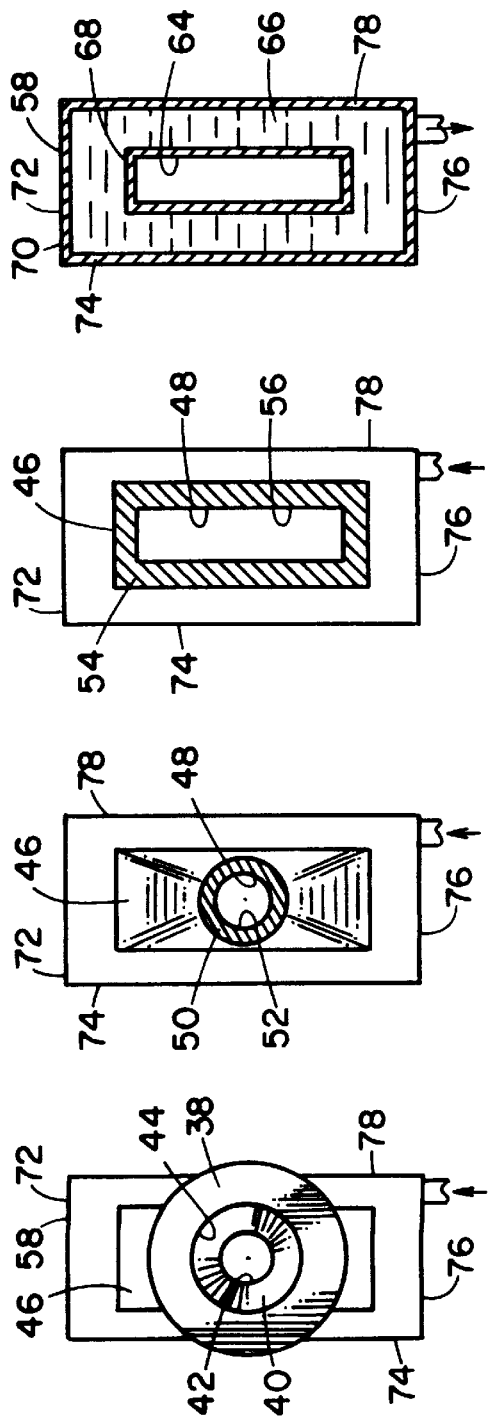

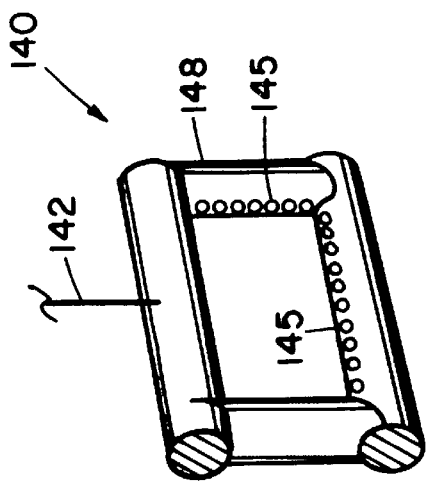
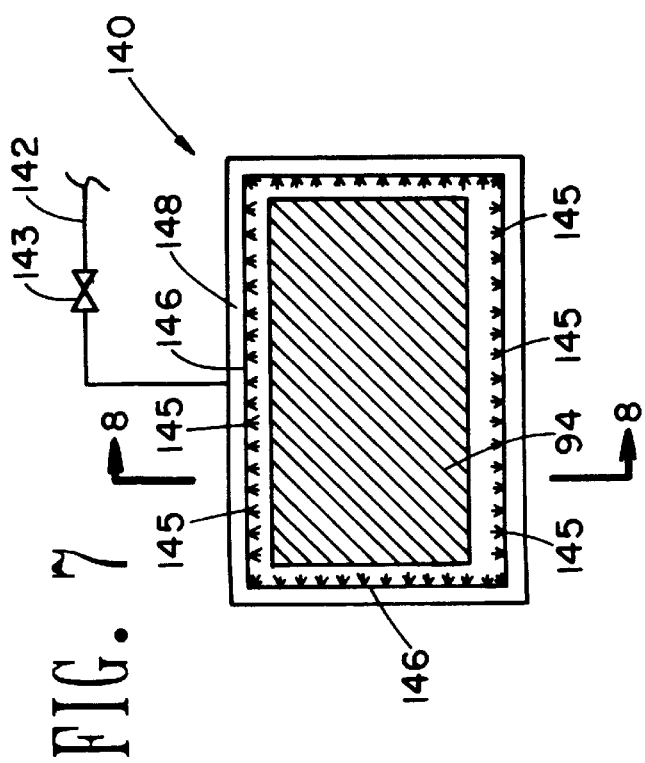
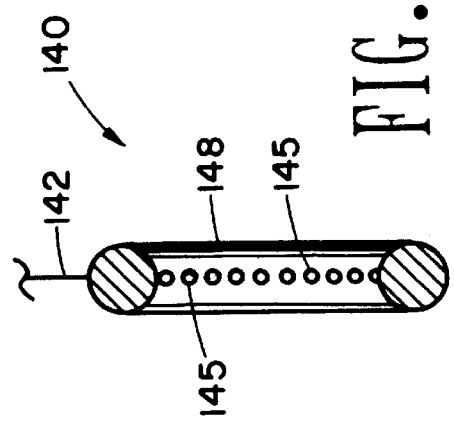

PROCESS AND APPARATUS FOR COOLING AN EXTRUDATE

RELATED APPLICATION DATA

This application is a Continuation-in-part (CIP) of application Ser. No. 243,842, filed May 16, 1994, now issued as U.S. Pat. No. 5,523,328, which is a Division of application Ser. No. 07/873,410, filed Apr. 24, 1992, now issued as U.S. Pat. No. 5,312,573, which is a Continuation-in-part (CIP) of application Ser. No 07/740,376, filed Aug. 1, 1991, now abandoned.

BACKGROUND OF THE INVENTION

1. Field of the Invention

The present invention relates to a process and apparatus for extruding mixtures of thermoplastic and thermoset polymers and to articles made therefrom. In another aspect, the present invention relates to a process and apparatus for cooling extruded mixtures of thermoplastic and thermoset polymers and to articles made therefrom, wherein at least one of the polymers is recycled. In even another aspect, the present invention relates to a process and apparatus for cooling extruded mixtures of polyolefins and recycled rubber and to articles made therefrom. In still another aspect, the present invention relates to a process and apparatus for cooling extruded mixtures of polyethylene and tire particles and to articles made therefrom. In yet another aspect, the present invention relates to a process and apparatus for cooling extruded mixtures of polyethylene and tire particles and to articles made therefrom, by forcing air against the top, bottom and side surfaces of the extrudate. In even another aspect, the present invention relates to a process and apparatus for extruding mixtures of thermoplastic and thermoset polymers and to articles made therefrom, utilizing carbon black as a processing aid.

2. Description of the Related Art

Plastic materials are finding utility in more and more applications everyday. For example, plastics are used in all sorts of disposable applications such as diapers, product packaging, utensils, plates, cups, syringes, drink containers and shrink wrap. As another example, plastics are used as a major material of construction for electronic products such as telephones, computers, radios, stereos, kitchen appliances. As further example, plastics are utilized in automobiles in such applications as body molding, bumper guards, hoses, light covers, interior paneling, mud guards, floor mats and tires. In the construction industry, plastics are utilized in electrical wire, telephone wire, as paneling, horizontal surface tops, switches and moldings. Other examples, include the use of plastics in articles of clothing.

Unfortunately, as plastic materials proliferate into every facet of life, such materials become a larger portion of the waste stream. Disposable plastic items are used then disposed. Goods comprising plastic are trashed once the end of the useful life of the good is reached. Plastic waste is even generated during the process of making plastic articles in the form of off-spec material or "flash". Off-spec material may be rejected because of appearance or physical property deficiency. "Flash" refers to excess polymer on a formed article that must be removed from the formed article. The environmental pressures of today stress the recycling of these waste plastic materials whenever possible.

Plastics fall into one of two categories, thermoplastics and thermosets.

Thermoplastics are polymers that will have a softening temperature and a melting temperature. Examples of thermoplastics include polyvinyl chloride, nylon, polyurethane and polyolefins, Heating a thermoplastic above its softening temperature will soften it, and heating it above its melting temperature will melt it. It is easy to see that thermoplastics can be formed into a shape, melted and reformed. Thus thermoplastics lend themselves to recycling.

Thermosets, on the other hand, do not readily lend themselves to recycling. A thermoset is a polymer that solidifies or "sets irreversibly. Examples of thermosets include, phenolics, polyesters, rubber and synthetic rubber. Since these polymers irreversibly set, heating them does not melt them into a reformable liquid. Thermosets are thus difficult to recycle.

As old vehicle tires are generally considered to constitute an environmental eyesore, many efforts have been made to recycle tires.

U.S. Pat. No. 3,210,301, issued Oct. 5, 1955, to White discloses a rubber compounding product that is made by recycling vulcanized reclaimed rubber from tires by first removing fibers and then mechanically working the rubber in the presence of 0.1–35 parts atactic polypropylene per hundred parts rubber.

Several patents disclose the use of rubber in making a molding composition. For example, U.S. Pat. No. 3,267,187, issued Aug. 5, 1955 to Siosberg et al., discloses that rubber granules may be mixed with a thermoplastic resin and molded into sheets. Also, U.S. Pat. No. 4,320,082, issued Mar. 15, 1982 to Houle, discloses a molding composition made from rubber, nylon and a vulcanizing agent, such as sulfur or magnesium oxide. U.S. Pat. No. 4,481,335, issued Nov. 6, 1984, discloses a rubber molding composition comprising tire rubber scrap, a sulfur curable polymeric binder and a curing agent for the binder. Finally, U.S. Pat. No. 4,795,603, issued Jan. 3, 1989 to Nagayasu, discloses an injection molding composition comprising 10–20 percent rubber particles and 70–90 percent polyethylene or Polypropylene waste. However, these compositions are generally for batch type molding processes rather than a Continuous extrusion type process.

U.S. Pat. No. 4,028,288, issued Jun. 7, 1977, and U.S Pat. No. 4,003,408, issued Jan. 18, 1977, both to Turner, both disclose processes for reclaiming tire rubber utilizing particalized tires, but excluding the metallic content thereof. Turner '288 limits the amount of cord content to less than 10 percent. Thus neither Turner patent discloses a method for processing the whole tire.

Finally, U.S. Pat. No. 4,970,043, issued Nov. 13, 1990, discloses a method of recycling "high grade" rubber having reduced debris as compared to reground rubber obtained from many automobile tires. The high grade rubber is extruded with a thermoplastic to form a semi-stable moldable product which is then cooled to form a stable moldable product. Since this process requires "high grade" rubber, tires containing debris cannot be processed.

Applicant is the coinventor of grandparent application, now U.S. Pat. No. 5,312,573, which discloses an apparatus and process which reuse whole tire waste, including metal and fabric belts and tire beads. As disclosed in the '573 patent, the extrudate is dimensionally stable as it leaves the cooling chamber 58 of the extruder. As the extrudate travels along conveyor 96, it is subjected to cooling as it passes through ambient air.

Numerous attempts have been made to address the cooling of an extrudate as it leaves an extrusion die or cooling chamber.

Principles Of Polymer Systems, Ferdinand Rodriguez, McGraw-Hill, 1972, at 322–327, discloses that air-cooling may be utilized to cool an extrudate in order to gain dimensional stability.

U.S. Pat. No. 3,242,529, issued Mar. 29, 1966 to Parr et al., discloses a melt spinning apparatus with oppositely directed inert gas streams for continuously supplying an inert gas at the temperature of the spinnerette to the vicinity of the face of the spinnerette plate to prevent the occurance of "drip". The inert gas is provided under conditions that will not substantially alter the normal extrusion and cooling conditions.

U.S. Pat. No. 3,460,200, issued Aug. 12, 1969 to Zaitsev et al., discloses a cabinet for air-stream cooling of filament spun from a polymeric melt, in which a plurality of partitions form sections to provide guided travel of the air stream across the filaments to preclude whirls in the steam as well as its endwise motion along the filament bundle.

U.S. Pat. No. 3,502,763, issued Mar. 24, 1970 to Hartmann, discloses a process of producing non-woven fabric fleece in which fused polymer is extruded from spinneret holes in filament form, and immediately thereafter seized on both sides by heated gas currents dischared from two slit-like openings in the direction of travel of the filaments.

U.S. Pat. No. 4,133,620, issued Jan. 9, 1979 to Lehner, discloses a polymer filament manufacturing device in which a cooling gas is passed across extruded filaments through a multiplicity of nozzles arranged on one side of the filaments.

U.S. Pat. No. 4,452,752, issued Jun. 5, 1984 to Harder et al., discloses a method and apparatus for extruding a thermoplastic shape along a shaped cooling surface.

U.S. Pat. No. 4,801,458, issued Mar. 7, 1989 to Oshima et al., discloses a process for extrusion-molding cermic bodies, which includes continuously extruding a ceramic body through a die of an extruder and holding it on a porous support at a slightly floating shape by an air pressure which is jetted from pores of the support onto the underside of the ceramic body.

U.S. Pat. No. 5,108,277, issued Apr. 28, 1992 to Dixon, discloses an apparatus for cooling extruded material, which apparatus supports the extrudate on a cushion of air while controlling the temperature of the air.

U.S. Pat. No. 5,141,700, issued Aug. 25, 1992 to Sze, discloses a melt spinning process for polyamide industrial filaments, in which the freshly-extruded filaments enter an enclosed zone that is maintained at superatmospheric pressure by a controlled flow of air at low positive pressure and the filaments leave the zone through a constriction, either a venturi or a tube, assisted by the concurrent flow of such air at a high controlled velocity.

In spite of the above methods, there is a need for an improved method and apparatus of cooling an extrudate as it leaves an extrusion die or cooling chamber.

This and other needs in the art will become apparent to those of skill in the art upon review of this specification, including its drawings and claims.

SUMMARY OF THE INVENTION

It is an object of the present invention to provide an improved method and apparatus of cooling an extrudate as it leaves an extrusion die or cooling chamber.

This and other objects of the present invention will become apparent to those of skill in the art upon review of this specification, including its drawings and claims.

According to one embodiment of the present invention, there is provided a process for extruding a extrusion feed, which includes extruding the feed through an extrusion die to form an extrudate, and further includes directing a cooling gas toward the extrudate top, bottom and sides from a multiplicity of gas jets positioned around the periphery of the extrudate. In a more specific embodiment, the extrusion feed can comprise one or more thermoplastics, and also may include one or more thermosets. In an even more specific embodiment, the extrusion feed may include ground tire waste and thermoplastic.

According to another embodiment, the present invention provides a process for producing useful articles from ground whole tire waste and apparatus for accomplishing the process. The process includes continuously extruding a heated mixture of thermoplastic and ground whole tire waste into the interior of an elongated open-ended casting chamber. The casting chamber has a cross-section corresponding substantially to the cross-section of the desired useful article. The exterior surface of the casting chamber is continuously cooled to remove a sufficient amount of thermal energy from the casting chamber such that a dimensionally stable extrudate emerge from its open end. The produced extrudate is further cooled by directing cooling gas toward the extrudate from a multiplicity of jets surrounding the extrudate. The cooled extrudate is then cut to length.

According to even another embodiment of the present invention, the apparatus for accomplishing the above described process includes an extruder for extruding a mixture of thermoplastic and ground whole tire waste from an outlet of the extruder. An end nozzle is attached to the extruder outlet. The end nozzle has a frustroconical inner surface converging in the direction of extrusion. A transition nozzle is attached to the end nozzle. The transition nozzle has an inner surface that transforms from an inlet having circular cross-sections to an outlet having rectangular cross-sections. A casting chamber having an inlet attached to the outlet of the transition nozzle terminates at an open-ended outlet. The casting chamber has a uniform inner surface with substantially the same cross-section as the transition nozzle outlet. The casting chamber is constructed and arranged to receive coolant about an exterior surface to remove thermal energy conducted from the inner surface. Positioned at the exit end of the casting chamber are a multiplicity of gas jets, arranged to surround an extrudate exiting the casting chamber and to provide a cooling gas directed toward the extrudate from the each jet.

According to still another embodiment of the present invention, there is provided a process for making an extruded article by first forming a mixture comprising in the range of about 5–95 weight percent thermoplastic, in the range of about 0–20 weight percent reinforcing material and in the range of about 5–95 weight percent thermoset particles, all based on the total weight of the mixture. The next step is heating the mixture to a temperature at least the melting point of the thermoplastic and less than the degradation temperatures of both the thermoplastic and thermoset Then, extrude the mixture through a die having a cross-sectional shape desired of the end product at sufficient conditions so that the final product will have a shore A hardness of at least about 70. Finally, the extrudate is cooled into the final product, by directing cooling gas toward the extrudate from a multiplicity of jets surrounding the extrudate. The cooled extrudate is then cut to length.

According to yet another embodiment of the present invention, there is provided an apparatus for producing useful articles of a desired cross- sectional shape, from a mixture of thermoset and thermoplastics materials, the apparatus comprising an extruder for extruding an extrudate comprising the mixture through an extruder outlet and a forming nozzle attached to and adapted to receive extrudate from the extruder outlet, wherein the nozzle comprises a nozzle outlet adapted to form the extrudate into a cross-sectional shape substantially equal to the desired cross-sectional shape of the useful article to be produced, and wherein the nozzle further comprises at some point prior to the nozzle outlet an expansion section having an inner cross-sectional shape that is greater than the desired cross-sectional shape of the useful article to be produced. The apparatus further comprises a cooling chamber attached to, adapted to receive extrudate from, and having substantially the same cross-sectional shape as the nozzle outlet, and further adapted to sufficiently cool extrudate into a stable article of the desired cross-sectional shape. Positioned at the exit end of the cooling chamber are a multiplicity of gas jets, arranged to surround an extrudate exiting the cooling chamber and to provide a cooling gas directed toward the extrudate from the each jet.

According to even still another embodiment of the present invention, there is provided a method of extrusion. The method includes extruding a mixture comprising thermoplastic, ground tire waste and carbon black to form an extrudate, and then cooling the extrudate. In a more specific embodiment, the ground tire waste comprises metal debris.

A more complete understanding of the invention and its advantages will be apparent from the Detailed Description of the Invention taken in conjunction with the accompanying drawings, in which like numerals refer to like and corresponding elements, and in which:

BRIEF DESCRIPTION OF THE DRAWINGS

FIG. 2 is a schematic, partially broken-away, enlarged, partial, side view of the apparatus of FIG. 1.

FIG. 3 is a sectional view taken along lines 3—3 of FIG. 2.

FIG. 4 is the Sectional view taken along lines 4—4 of FIG. 2.

FIG. 5 is a sectional view taken along lines 5—5 of FIG. 2.

FIG. 6 is a sectional view taken along lines 5—5 of FIG. 2.

FIG. 7 is a cross-sectional view of cooling apparatus 140, showing hollow tubing 148, gas jets 145, gas flow 146, gas supply line 142, gas supply control valve 143, and extrudate 94.

FIG. 8 is a cross-sectional view of cooling apparatus 140 of FIG. 7, taken at 8—8, with extrudate 94 not shown.

FIG. 9 is an isometric view of cooling apparatus 140 with extrudate 94 not shown.

DETAILED DESCRIPTION OF THE INVENTION

Figure 1:
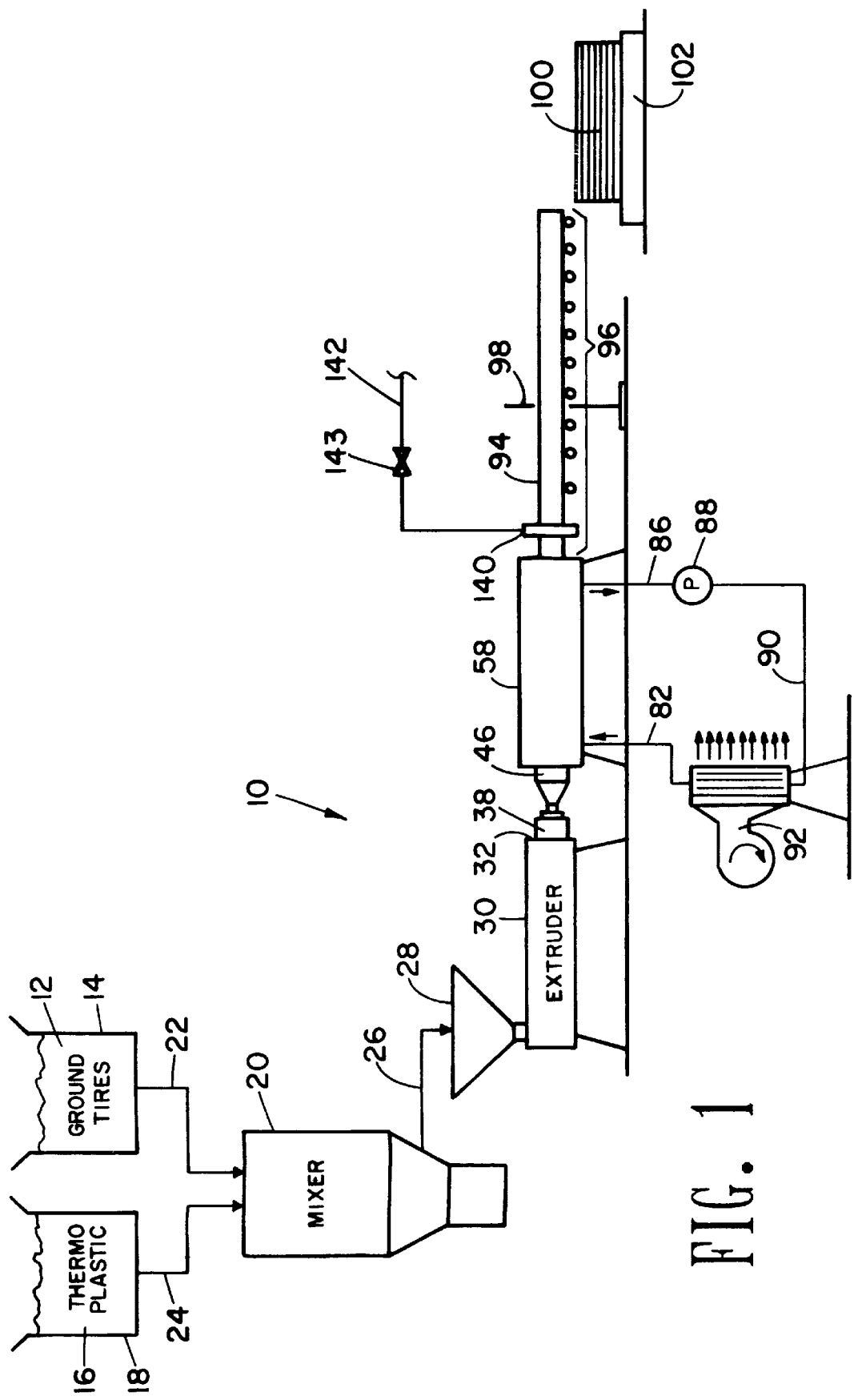
FIG. 1 is a schematic view of apparatus constructed to practice the process of the present invention.

In accordance with the present invention, thermoplastic and thermoset materials are mixed together, heated to melt the thermoplastic, then extruded into the desired shape through a die and then cooled.

Thermoset materials useful in the present invention include any thermoset that when processed according to the present invention will yield a product having the desired properties. Mixtures of thermosets may be used. Generally, the thermoset utilized in the present invention includes at least one selected from the group consisting of rubber, phenolics, alkyds, amino resins, polyesters, epoxides and silicones. Preferably, the thermoset utilized in the present invention is rubber.

"Rubber" as used herein is intended to mean one or more of the following: natural rubber, polymers, interpolymers and copolymers of conjugated diolefins, i.e., polybutadiene, butadiene-styrene copolymers, butadiene-acryionitrile copolymers, polymers and copolymers of methylpentadiene; polymeric forms of chlorine substitution products of conjugated diolefins, i.e., polychioroprene; polymers of non-conjugated systems, i.e., polyisobutylene and copolymers of isobutylene and isoprene; and condensation polymers of the polysulphide type.

The thermosets utilized in the present invention may be obtained from any source, including being produced insitu in the process. However, it is generally commercially desirable that the thermosets utilized in the present invention be obtained as scrap or waste material.

When rubber is utilized as the thermoset material, it is generally desirable that scrap or waste rubber from tires be utilized In the process of the present invention it is not critical that high grade rubber be utilized. Furthermore, in the process of the present invention, it is not critical that metal or fibers in the tire be removed. Rather, as one novel feature of the present invention, the process of the present invention is capable of processing whole tire into a useful article. Generally, tires that may be processed in the present invention include truck, aircraft, heavy machinery, motorcycle, bicycle and automobile tires. Preferably, automobile tires are utilized in the process of the present invention. Tires typically comprise about 50–70 percent rubber, 20–30 percent steel and 5–10 Percent textile fibers.

In the present invention, the percentage of thermoset in the mixture to be extruded will depend upon economic, process factors and the desired properties of the article to be produced. Generally, the mixture to be extruded will comprise in the range of about 5 to about 95 weight percent thermoset. Preferably, the mixture to be extruded will comprise in the range of about 40 to about 94 weight percent thermoset. More preferably, the mixture will comprise in the range of about 50 to about 85 weight percent thermoset, and most preferably, in the range of about 50 to about 80 weight percent thermoset.

It must be remembered that the particle size of the thermoset materials fed to the extruder will not be drastically altered in the extrusion process. The particle size of the thermoset material processed in the present invention will generally be any size that will produce a product having the desired properties. The particle size of the thermoset material will also be dependent upon the processing capabilities of the equipment. Generally, the particles of thermoset material utilized in the present invention will range in size from a fine powder to those with a diameter in the range of about 1/32nd inch to about 1/4 inches in diameter and in the range of about 1/32nd inch to about 10 inches long. Preferably, the thermoset material utilized in the present invention will be in the range of about 1/32nd inch to about 1/8th inch in diameter and in the range of about 1/15th inch to about 3 inches long. The shape of the particle is not critical in the practice of the invention, but will be any shape that will provide the desired end properties in the formed object. Generally the shape will range from irregular, spherical to elongated and will be dependent upon the size reduction method utilized.

Large thermoset pieces may be reduced to smaller pieces utilizing techniques well known to those of skill in the art.

Such techniques include milling, crushing, grinding, shredding, and cryogenic breaking processes in which the material is cooled in liguld nitrogen or the like and pulverized.

Thermoplastic materials useful in the present invention include any thermoplastic that when processed according to the present invention will yield a product having the desired properties. Mixtures of thermoplastics may be used. Generally, the thermoplastics utilized in the present invention includes at least one selected from the group consisting of polyolefins, polyvinyl chloride, nylons, fluorocarbons, polyurethane prepolymer, polystyrene, high impact strength polystyrene, cellulosic resins, acrylic resins, polyphenylene oxide and polyphenylene sulfide. Preferably, the thermoplastic utilized in the present invention includes at least one selected from the group consisting of polyolefins, and high impact strength polystyrenes. "Polyolefins" refers to polymers derived from simple olefins. The polyolefins may be homopolymers of C2–C20 alpha-olefins and may also be copolymerized with at least one selected from C2–C20 alpha-olefins and C3–C20 polyenes. Preferable polyolefins include ethylene and propylene which refer not only to the homopolymer, but also to polymers having 2 or more monomers in which at least one of the monomers is ethylene br propylene. Most preferably, the thermoplastic utilized in the present invention includes at least one selected from the group consisting of polyethylene, polypropylene, and high impact strength polystyrenes.

The thermoplastic materials utilized in the present invention may be virgin materials, or may also be waste or scrap materials.

The particle size of the thermoplastic materials is not critical to the practice of the present invention. The thermoplastic particles will be melted and reformed in the extrusion process. Therefore the particle size is dependent upon the processing capabilities of the equipment utilized.

In the present invention, the percentage of thermoplastic in the mixture to be extruded will depend upon economic, processing factors and the desired properties of the article to be produced. Generally, the mixture to be extruded will comprise in the range of about 5 to about 95 weight percent thermoplastic. Preferably, the mixture to be extruded will comprise in the range of about 5 to about 50 weight percent thermoplastic. More preferably, the mixture will comprise in the range of about 15 to about 50 weight percent thermoplastic, and most preferably, in the range of about 20 to about 40 weight percent thermoplastic.

Some desired end products may require the incorporation of reinforcing material for added strength. In addition to any reinforcing material that is part of the thermoplastic or thermoset materials utilized, other reinforcing material may optionally be added to provide added strength to the final produced product. For example, carbon, graphite and synthetic fibers may be added to the process. It is also possible to coextrude the mixture with continuous reinforcing fibers, matting or webbing oriented in the machine direction.

In the present invention, the percentage of reinforcing material in the mixture to be extruded will depend upon economic, processing factors and the desired properties of the article to be produced. When present in the mixture to be extruded, the reinforcing material will comprise in the range of about 1 to about 30 weight percent of the mixture. Preferably, the mixture to be extruded will comprise in the range of about 2 to about 20 weight percent reinforcing material.

In the process of the present invention, additives as generally known to those of skill in the extrusion art may be utilized. Such additives include processing aids, lubricants, colorants, reinforcing fibers, stabilizers, antioxidants, fillers, conductive additives, heat stabilizers, blowing agents and plasticizers. Such additives, if utilized, will generally comprise in the range of about 0.1 to about 10 weight percent of the extrusion mixture.

In the practice of the present invention, a preferred processing aid to be utilized is carbon black. When utilized, carbon black will generally comprise in the range of about 0.1 to about 10 weight percent of the extrusion mixture. Preferably, carbon black will comprise in the range of about 1 to about 5 weight percent of the extrusion mixture, and most preferably, in the range of about 1.5 to about 3.0 weight percent of the extrusion mixture.

The above described mixture must be heated to a temperature sufficient to melt the thermoplastic components, but not so great as to degrade any of the polymers in the mixture.

The present invention may be carried out in any apparatus that will sufficiently perform the necessary process steps and produce a product with the desired properties. The apparatus of the present invention will generally comprise a mixing section for receiving and mixing the thermoplastic and thermoset materials, a heating section for heating the mixture to the thermoplastic melting temperature, an extrusion section for extruding the mixture, a transition section connecting the extrusion section and the forming section, a forming section that comprises a die with the shape of the desired object, and a cooling section. These sections may be distinct sections, or they may be combined. For example, while not preferred, the thermoplastic and thermoset materials may be mixed in the extruder hopper.

In a preferred embodiment of the present invention, the cooling section will comprise a multiplicity of gas jets which are arranged to surround an extrudate, such that each gas jet will provide gas flow toward the extrudate. The multiplicity of jets may be used along with or instead of a cooling or casting chamber. Most preferably, the gas jets are arranged to surround the extrudate in a plane normal to plane in which the extrudate is traveling.

In a simple embodiment, the gas jets may comprise aperatures, in tubing or piping. Such aperatures will generally range from about $1/32$" to about $1/2$" in diameter, preferably in the range of about $1/16$" to about $1/4$" in diameter, and even more preferably about $1/8$" diameter. Nozzles or other gas guides may also be provided to direct the cooling gas toward the extrudate. The gas jets will generally be spaced about $1/32$" to about 2" apart, preferably about $1/8$" to about 1" apart.

The gas jets serve to both cool the extrudate, and to stabilize the extrudate from any sagging or rippling. The use of the gas jets is believed to increase the extrusion output. The extrusion output increase will depend upon the geometry of the extrudate, and other operating conditions. For example, applicant has found that in the making of extrudate having cross-sectional dimensions corresponding to conventional 2×8 lumber board, production can be increased at least 8%. As another example, applicant has found that in the making of $3/4$" diameter "rope" to be ground into pellets, output increased from about 150 lbs/hour to over 300 lbs/hour.

The gas velocity at the gas jets must be sufficient to provide the necessary cooling, and to prevent sagging and rippling of the extrudate. The cooling gas may be pumped or provided under pressure. Gas velocity will be determined by the gas jet diameter and gas pressure. For example, for $1/16$" to $1/8$" diameter apertures, generally about 20 psi to about 200 psi gas, preferably about 50 psi to about 100 psi gas, is sufficient to provide the necessary cooling and stabilizing effect.

The gas utilized in the gas jet cooler of the present invention may be any suitable gas that will not substantially negatively impact the extrudate. This, suitable gases will be a function of the composition of the extrudate, and the operating conditions. Generally, inert gases are suitable for use. Other suitable gases include air, nitrogen, and carbon dioxide.

The temperature of the gas utilized in the present invention is generally any temperature that will provide the desired cooling effect. It is expected that in numerous cases, ambient air will suffice.

In the practice of the present invention, multiple extruders may be used to heat the various polymers utilized in the present invention. This may be economically beneficial when thermoplastics having greatly different melting temperatures are utilized. The thermoplastics may each be melted separately in different extruders and later combined together. It will also be necessary to heat the thermoset particles to the melting temperature of the thermoplastics so that when the polymers are mixed together, the thermoset particles will not cool the thermoplastics to below their melting temperature Referring now to FIGS. 1–7, there is illustrated one embodiment of the apparatus of present invention. Apparatus 10 is constructed and arranged to practice the process of the present invention, which is a process for producing useful articles from mixtures of thermoset and thermoplastic polymer material in an extrusion casting process.

As shown, the mixing section comprises containers 14 and 18 and mixer 20. The ground thermoset material 12 is initially delivered to the site in a container 14. Thermoplastic material 16 is delivered to the site in a container 18. Thermoset material 12 and thermoplastic material 16 are conveyed in a predetermined proportion to a mixer 20, as indicated by arrows 22 and 24, where the starting materials are thoroughly premixed. The premixed starting materials are then conveyed as shown by arrow 26 to the inlet hopper 28 of extruder 30.

In the embodiment shown, the heating and extrusion sections are combined in extruder 30. In Conventional fashion, extruder 30 heats and Conveys the starting materials to an extruder outlet 32. The heating of the extrudate may be by any suitable means, such as for example, heated gases such as steam, heated liquids or oils, electrical heating elements and combinations thereof. In the embodiment shown, the extrudate is heated by way of electrical resistance coils 34 and Conveyed by way of screw 36.

In the transition section, it is necessary, that the necessary pressure for the particular materials processed be achieved to sufficiently consolidate the materials, such that the final formed end product will have the desired physical properties. For example, for typically processed 50%/50% mixtures of polyethylene/tire rubber, the consolidation pressure must be in the range of about 200 psi to about 2000 psi.

This necessary consolidation pressure may be produced by a combination of several factors. The screw design, the shape of the end nozzle 38, the shape of the transition nozzle 46, and the shape of the transition outlet nozzle 54, all may effect the consolidation pressure. For example, consolidation pressure is increased by providing in the transition section, an end nozzle 38 converging in the direction of extrusion, a transition outlet nozzle 54, all converging in the direction of extrusion or combinations thereof.

In addition, consolidation pressure is increased if at some point in the transition section, the cross-sectional area of the extrudate is greater than the cross-sectional area of the die through which the extrudate will pass at the end of the transition section. If the extrusion outlet cross-sectional area is larger than the die cross-sectional area, then this condition is easily provided. If the extrusion outlet cross-sectional area is smaller than the die cross-sectional area, then at some point in the transition section, there must be an enlarged section to provide this condition.

In the embodiment shown, the consolidation pressure is obtained utilizing the proper screw design and end nozzle 38 converging in the direction of extrusion. The transition section consists of end nozzle 38 and transition nozzle 46. As shown, end nozzle 38 is tapered in such a manner as to increase the consolidation pressure in transition nozzle 46.

End nozzle 38 is attached to extruder outlet 32. As best shown in FIGS. 2 and 3, end nozzle 38 has a frustroconical inner surface 40 converging in the direction of extrusion. Frustroconical inner surface 40 is joined to a cylindrical inner surface 42 having a cross-sectional diameter smaller in dimension than the inlet cross-sectional diameter 44 of frustroconical inner surface 40.

Transition nozzle 46 is attached to end nozzle 38. Transition nozzle 46 has an inner surface 48 that transforms from an inlet 50 having a cylindrical inner surface 52 with circular cross-sections, as best shown in FIG. 4. Inner surface 52 transforms to an outlet 64 having an inner surface 56. Inner surface 56 has rectangular- cross-sections, as best shown in FIG. 5. Heat may be supplied to transition nozzle 46 by way of an electric resistance beating element 57.

In a preferred embodiment (not shown) to the transition section, the transition section will comprise a transition outlet nozzle 54 tapered in the direction of extrusion and at least one portion of the transition nozzle 46 will have a cross-sectional area greater than the cross-sectional area of inner surface 46 at the outlet of transition nozzle 46. End nozzle 38 may optionally eliminated if sufficient consolidation pressure is obtained to produce end products having the desired physical properties.

Transition nozzle outlet 54 is attached to cooling chamber 58. Methods of cooling an extrudate that has passed through a die are well known, and any suitable method and apparatus may be utilized as cooling chamber 58.

In the embodiment shown, cooling chamber 58 has an inlet 60 attached to outlet 54 of transition nozzle 46 and an outlet 52 that is open-ended. Cooling chamber 58 has a uniform inner surface 64 with substantially the same cross-section as surface 56 of the transition nozzle outlet 54. Cooling Chamber 58 is constructed and arranged to receive coolant 66 about an exterior surface 68 to remove thermal energy conducted from inner surface 64. Exterior surface 68 is contained within a coolant jacket 70 formed by jacket walls 72, 74, 76, 78.

Coolant 66 is supplied to coolant jacket 70 by way of an inlet 80 through hose 82. Coolant exits jacket 70 through outlet 84 and hose 86. As best shown in FIG. 1, coolant 66 is circulated by way of a pump 88, which Conveys coolant through hose 90 to a beat exchanger 92 before returning it to jacket 70 by way of hose 82.

The amount of thermal energy to be removed by circulating coolant 66 can be determined by routine experimentation, and is a factor of the volume of jacket 70, the area of surface 68, the length of casting chamber 58, circulation rate established by pump 88, and heat exchange capability of heat exchanger 92. Cooling chamber 58 may be provided in sections, such that its total length is adjustable. Some sections may be liquid cooled while other sections are air cooled. The cooling system must be sufficient to reduce the skin temperature of the extrudate at the open end of cooling chamber 58 such that the extrudate is dimensionally stable during further cooling.

Positioned after cooling chamber 58 is gas jet cooler 140, which can been seen in FIGS. 1, 7–9. Valve 143 controls the cooling gas flow to gas jet cooler 140 through gas line 142. Gas jet cooler 140 provides further cooling of extrudate 94. As shown in FIG. 7, extrudate 94 is supported and cooled by gas 146 exiting jets 145, which surround extrudate 94.

Gas jets 145 may comprise apertures or nozzles or any other such gas direction apparatus. In the embodiment shown in FIGS. 8 and 9, gas jets 145 comprises apertures in gas jet cooler 140.

Extrudate 94 emerging from gas jet cooler 94 is supported by a conveyor 96, and cut to length by way of a shear 98 to produce useful articles 100. Useful articles 100 may be stacked on a pallet 102 to enable further handling.

In the operation of this embodiment, a pre-mixed mixture of ground thermoset waste 12 and thermoplastic material 16 is continuously extruded by way of extruder 30 into the interior of cooling chamber 58. Typical temperatures for processing some polyethylene/tire rubber mixtures are in the range of about 350° F. to about 525° F. at outlet 32. Cooling chamber 58 has a cross-section defined by surface 64 that corresponds substantially to the cross-section of the desired useful articles 100 Exterior surface 68 of casting chamber 58 is continuously cooled by way of coolant 66 circulated through exchanger 92. Sufficient thermal energy is removed from casting chamber 58 such that extrudate 94 is dimensionally stable as it emerges from the open end 62 of the casting chamber. Extrudate 94 is further cooled by gas jet cooler 140. After emerging from cooler 140, extrudate 94 is cut to length by shear 98.

As can be seen, useful articles 100 are members having a rectangular cross-section and cut to predetermined lengths. Useful articles 100 are ideal for use as building material, and may be formed having cross-sections corresponding to conventional dimensional lumber, such as 2×4's, 2×6's, 4×4's, etc. The useful articles have a strength and fastener holding ability similar to or exceeding that of wood lumber, and are virtually indestructible. The articles can be sized from 1×1 (0.75"×75") square cross-section all the way to large diameter, round utility poles. It is expected that the useful articles will greatly out perform lumber in environmental conditions involving moisture, sunlight and extreme temperatures. Obviously, the use of one hundred percent waste material to produce a product which substitutes for lumber has substantial ecological benefit.

Material 12, the ground whole tire waste, is available from waste tire processors without any rubber, fabric or metal material removed. A key advantage of this invention is that the whole tire waste can be utilized, as opposed to many prior art attempts to utilize tire waste which require use of a "high grade" rubber, substantially free of foreign fabric and metal debris At present, ground whole tire waste is available from tire processors essentially free of charge.

The thermoplastic material 16 acts as a kind of "glue" or binder to bind the ground whole tire waste 12 together in the extrudate 94.

Interior surface 64 of casting chamber 58 may be polished or coated with a fluoro polymer mold-release agent in order to affect the surface roughness of the articles. The extrudate may experience some shrinkage in dimension, so the cross-sectional area of casting chamber 58 must be sized accordingly. Electric resistance heating element 57 may be required depending on the amount of transition in order to keep the extrudate in a plastic form until it begins to cool and harden in casting chamber 58.

The ratio of tire waste to thermoplastic material establishes the characteristics of the end product. A mixture comprising six percent or less thermoplastic material by weight is very rubbery, has reduced strength and requires a relatively slow process rate due to a longer bonding time. A product produced with 60 percent or higher thermoplastic is very dense and resilient, but experiences undesirable changes in resilience with temperature. In extreme cold temperatures, the product becomes breakable.

The product of the present invention will generally have a tensile strength, as measured by ASTM D412, of at least 850 psi. Preferably, the product of the present invention will have a tensile strength of at least 1000 psi, and most preferably a tensile strength of at least 1500 psi.

The product of the present invention will generally have an elongation in the range between about 0 to about 300 percent. Preferably, the elongation will be in the range of about 5 to about 100 percent. Most preferably, in the range of about 5 to about 40 percent.

The product of the present invention generally will have a shore A hardness greater than about 70. Preferably, the product of the present invention will have a shore A hardness greater than about 80. More preferably, the product of the present invention will have a shore A hardness greater than about 90, and most preferably greater than about 100.

The product of the present invention will generally have a screw retention, as measured by ASTM E588, of at least 300 lbs. Preferably, the product of the present invention will have a screw retention of at least 450 lbs., and most preferably at least 500 lbs.

The specific gravity of the product of the present invention will generally depend upon the thermoset and thermoplastic materials utilized and the operating conditions. Generally, the specific gravity of the product of the present invention will be at least about 0,8. Preferably, the specific gravity will be in the range of about 0.9 to about 1.1.

The following examples are provided by way of further illustration rather than limitation.

EXAMPLES

The following examples are provided to illustrate the present invention, and are not intented to limit the scope of the claims of the invention.

EXAMPLE 1

An apparatus substantially as shown in FIGS. 1–6, but without gas jet cooler 140, was employed to produce useful articles 100 having a cross-section corresponding to a conventional 2×8 lumber board (1.5" by 7.25"). Ground whole tire waste and waste polyethylene were used in the starting mixture. The plastic binder material comprised 12–15 percent by weight. The exit temperature of the extrudate was between 355° F. and 400° F. Casting chamber 58 was five feet in length, with coolant 66 being supplied by a hose connected to a tap water faucet and directed against one of the wide (7.25") exterior surfaces. No enclosed jacket 70 was employed.

Extruder 30 was a conventional device having a 4.5" screw turning at 15 PPM. The screw had a ratio of 24:1, and thus bad a length of 108".

The extrudate surface was relatively smooth on the side that received the direct stream of coolant, while the other three sides were relatively rough. A smooth or rough surface texture may thus be established by the cooling efficiency and consistency. An approximately 1" water jacket 70 around the extrudate will provide a smooth surface, with sufficient coolant circulation and Heat exchange capability. By contrast, if the first three to five feet of casting chamber 58 are only air-cooled, then a consistently rough surface may be obtained.

End nozzle 38 had an inlet diameter 44 of 4.5" that converged to a cylindrical surface 42 having a diameter of 3". The frustroconical surface provides sufficient back pressure in the extruder. No screen was used at the outlet of the extruder. The pellets being English pea size or smaller. The particles in the ground whole tore waste were similarly sized.

EXAMPLE 2

A 4×4 (3.5"×3.5") article was produced using the apparatus described in Example 1. The outlet temperature was approximately 600° F., and the starting mixture comprised 12–15 percent thermoplastic binder material and 65–68 Percent ground tire waste, by weight. The extruder was turned at a rate of 2 RPM.

EXAMPLE 3

An apparatus substantially as shown in FIGS. 1–6, but without gas jet cooler 140, was employed to produce useful articles 100 having a cross section corresponding to a conventional 2×8 lumber board (1.5"by 7.25"). Ground whole tire waste and waste polyethylene were used in the starting mixture. The plastic binder material comprised 35–38 percent by weight, with the balance comprising whole ground tire waste. The exit temperature of the extrudate was between 375° F. and 400° F. Casting chamber 48 was 14 inches in length, with coolant 66 being supplied by a refrigeration unit and pump which forced coolant in and out of the jacket of the chill section or sizing die.

Extruder 30 was a conventional device having a 4.51" screw turning at 15 RPM. The screw had a ratio of 24:1 and, thus had a length of 108".

End nozzle 38 had an inlet diameter 44 of 4.5" that converged to a cylindrical surface 42 having a diameter of 3". The frustroconical surface provides sufficient back pressure in the extruder. No screen was used at the outlet of the extruder. The thermoplastic binder material 16 was ground into pellets English pea size or smaller. The particles in the ground while tire waste were similarly sized.

The extrudate was developed with a smooth surface and well consolidated core by varying land length and cooling chamber temperature. Optimum consolidation and surface finish were obtained with a land length of 23 inches and a sizing temperature of 45°–64° F. resulting in a minimum die pressure of 200 psig. By varying die temperature and extrusion rates in a manner known by one proficient in extrusion, a quality product with minimum physical properties as shown in Table I may be produced.

TABLE 1

| Minimum Physical Properties of Extruded Product Containing 35–38 Percent Plastic Binder | |
|---|---|
| Specific Gravity TEX207° F. | 0.902 |
| Shore A Hardness | 95 |
| Screw Retention[1], ASTM E588, pounds | 500 |
| Tensile Strength, ASTM 0412, psi | 897 |

TABLE 1-continued

| Minimum Physical Properties of Extruded Product Containing 35–38 Percent Plastic Binder | |
|---|---|
| Elongation, % | 13 |
| Deflection at midpoint of 15" free span with 1510 pound load, in. | 4.5 |

[1]One quarter inch hex head cap screw with 150 lbs/min loading rate, full screw engagement.

EXAMPLE 4

An apparatus substantially as described in Example 3, and as shown in FIGS. 1–7, except that a modified gas jet cooler was substituted for gas jet cooler 140, was employed to produce useful articles 100 having a cross section corresponding to a conventional 2×8 lumber board (1.5" by 7.25"). The apparatus was operated about 1 inch/min faster than in Example 3. The substitute modified gas jet cooler provided 80 psi ambient air though about ⅛" diameter apertures in tubing, only to the bottom side of the extrudate 94.

A 50–50 weight percent mixture of ground whole tire waste and waste polyethylene were used in the starting mixture.

Upon exiting the substitute gas jet cooler, visual imspection revealed the extrudate 94 included unacceptable waves and ripples.

EXAMPLE 5

An apparatus substantially as described in Example 4, and as shown in FIGS. 1–7, except that the gas jet cooler of the present invention was utilized instead of the cooler of Example 3, was employed to produce useful articles 100 having a cross section corresponding to a conventional 2×8 lumber board (1.5" by 7.25"). The apparatus was operated at the same speed as in Example 4, i.e., about 1 inch/min faster than in Example 3. The gas jet cooler provided 80 psi ambient air though about ⅛" diameter apertures in tubing, to the top, bottom, and sides of the extrudate 94.

A 50–50 weight percent mixture of ground whole tire waste and waste polyethylene were used in the starting mixture.

Upon exiting gas jet cooler 140, visual inspection revealed the extrudate 94 lacked the unacceptable waves and ripples that were detected in Example 4.

EXAMPLE 6

An apparatus substantially as described in Example 3, and as shown in FIGS. 1–6, was employed to produce "rope" having a ¾" diameter circular cross-section. This rope is subsequently ground in a hot melt granulator.

A 50–50 weight percent mixture of ground whole tire waste and waste polyethylene were used in the starting mixture.

About 150 lbs/hour of ground material was produced.

Next, ambient air was provided to one side of the extruded rope. The resultant rope warped due to uneven cooling of the surface of the rope. Furthermore, the extrudate could not be processed in the hot melt granulator, as it was not sufficiently cooled and was still tacky.

Finally, the gas jet cooler of the present invention was utilized to provide 80 psi ambient air though about ⅛" diameter apertures in tubing, to the top, bottom, and sides of the extrudate. Visual inspection of the produced rope revealed no warping of the rope. Production increased to over 300 lb/hour.

Whereas the present invention has been described with respect to a specific embodiment thereof, it will be understood that various changes and modifications will be suggested to one skilled in the art, and it is intended to encompass such changes and modifications as fall within the scope of the appended claims.

I claim:

1. A method of extruding an extrusion feed, comprising:
   (a) extruding the extrusion feed through an extrusion die to form an extrudate; and
   (b) directing a cooling gas toward the extrudate top, bottom and sides from a multiplicity of gas jets positioned around the periphery of the extrudate, wherein cooling gas is provided in a manner sufficient to support the extrudate.

2. The method of claim 1 wherein the feed comprises a thermoplastic.

3. The method of claim 1 wherein the feed comprises a thermoplastic and thermoset.

4. The method of claim 3 wherein the thermoset comprises ground tire waste.

5. The method of claim 4 wherein the ground tire waste includes metal debris.

6. The method of claim 4 wherein the thermoplastic comprises at least one selected from the group consisting of polyolefins, polyvinyl chloride, nylons, fluorocarbons, polyurethane prepolymer, polystyrene, high impact strength polystyrene, cellulosic resins, acrylic resins, polyphenylene oxide and polyphenylene sulfide.

7. The method of claim 4 wherein the multiplicity of gas jets are positioned around the extrudate, in a plane normal to the direction of extrusion of the extrudate.

8. The method of claim 1 wherein the multiplicity of gas jets are positioned around the extrudate, in a plane normal to the direction of extrusion of the extrudate.

9. An apparatus for extrusion of a feed to form an extrudate, comprising:
   (a) an extruder, having an exit end from which the extrudate exits; and
   (b) a multiplicity of gas jets adjacent the exit end, and positioned to direct cooling gas toward the extrudate top, bottom and sides, wherein the gas jets are arranged to provide gas sufficient to support the extrudate.

10. The apparatus of claim 9 wherein the multiplicity of gas jets are positioned around the extrudate, in a plane normal to the direction of extrusion of the extrudate.

11. A method of extrusion, comprising:
    (a) extruding a mixture comprising thermoplastic, ground tire waste and carbon black to form an extrudate;
    (b) directing a cooling gas toward the extrudate in a manner sufficient to support the extrudate.

12. The method of claim 11, wherein the ground tire waste comprises metal debris.

* * * * *